United States Patent
Lee et al.

(10) Patent No.: US 8,929,386 B2
(45) Date of Patent: Jan. 6, 2015

(54) METHOD AND APPARATUS FOR ESTABLISHING MULTIPATH IN HETEROGENEOUS INTERFACE ENVIRONMENT

(75) Inventors: Ji Hoon Lee, Yongin-si (KR); Jung Ho Kim, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 374 days.

(21) Appl. No.: 11/790,559

(22) Filed: Apr. 26, 2007

(65) Prior Publication Data

US 2008/0130664 A1 Jun. 5, 2008

(30) Foreign Application Priority Data

Nov. 30, 2006 (KR) ........................ 10-2006-0119684

(51) Int. Cl.
*H04L 12/28* (2006.01)
*H04W 40/28* (2009.01)
*H04L 12/701* (2013.01)
*H04L 12/733* (2013.01)
*H04L 12/707* (2013.01)

(52) U.S. Cl.
CPC ............. *H04W 40/28* (2013.01); *H04L 45/00* (2013.01); *H04L 45/122* (2013.01); *H04L 45/24* (2013.01)
USPC ....................................................... 370/401

(58) Field of Classification Search
None
See application file for complete search history.

(56) References Cited

U.S. PATENT DOCUMENTS

| 5,719,942 A * | 2/1998 | Aldred et al. ................. 709/228 |
| 6,977,938 B2 * | 12/2005 | Alriksson et al. ............. 370/401 |
| 7,349,360 B2 * | 3/2008 | Gutierrez et al. ............. 370/315 |
| 7,376,122 B2 * | 5/2008 | Draves et al. ................ 370/351 |
| 7,450,517 B2 * | 11/2008 | Cho ................................. 370/238 |
| 7,519,734 B1 * | 4/2009 | Dumitriu et al. ............. 709/238 |
| 7,808,960 B1 * | 10/2010 | Chan et al. .................... 370/338 |
| 2003/0202468 A1 * | 10/2003 | Cain et al. ..................... 370/229 |
| 2004/0022224 A1 | 2/2004 | Billhartz |
| 2004/0141511 A1 * | 7/2004 | Rune et al. .................... 370/401 |
| 2005/0129000 A1 * | 6/2005 | Sivakumar et al. ........... 370/351 |
| 2008/0207230 A1 * | 8/2008 | Jung et al. ..................... 455/458 |

FOREIGN PATENT DOCUMENTS

| EP | 1 111 874 A1 | 6/2001 |
| EP | 1 659 762 A1 | 5/2006 |
| KR | 10-2004-0083000 | 9/2004 |
| KR | 10-2005-0043246 | 5/2005 |
| KR | 10-2005-0080936 A | 8/2005 |

(Continued)

OTHER PUBLICATIONS

Wu et al., "Dynamic Adaptive Routing for a Heterogeneous Wireless Netowrk", 2004, Kluwer Academic Publishers, pp. 219-233.*

(Continued)

*Primary Examiner* — Chirag Shah
*Assistant Examiner* — Steve Young
(74) *Attorney, Agent, or Firm* — NSIP Law

(57) ABSTRACT

A method of establishing a multipath in a heterogeneous interface environment among wireless nodes including a source node, a relay node, and a destination node which receives a message from the source node via the relay node, the method including: receiving a route request message by a wireless node; and associating at least two heterogeneous interfaces of the wireless node by using a destination node address in the route request message.

26 Claims, 4 Drawing Sheets

(56) References Cited

FOREIGN PATENT DOCUMENTS

| | | |
|---|---|---|
| KR | 10-2006-0092811 | 8/2006 |
| KR | 10-2006-0098360 | 9/2006 |
| KR | 10-2006-0098891 | 9/2006 |
| WO | WO2005/027544 A1 | 3/2005 |

OTHER PUBLICATIONS

Korean Office Action issued on Jun. 25, 2012, in counterpart Korean Application No. 10-2006-0119684 (3 pages, in Korean, no English translation).

* cited by examiner

METHOD AND APPARATUS FOR ESTABLISHING MULTIPATH IN HETEROGENEOUS INTERFACE ENVIRONMENT

CROSS-REFERENCE TO RELATED APPLICATION

This application claims the benefit under 35 U.S.C. §119(a) of Korean Patent Application No. 10-2006-0119684, filed on Nov. 30, 2006, in the Korean Intellectual Property Office, the entire disclosure of which is hereby incorporated by reference.

BACKGROUND OF THE INVENTION

1. Field of the Invention

The present invention relates to a method and apparatus for establishing a multipath in a heterogeneous interface environment. More particularly, the present invention relates to a method and apparatus for establishing a multipath which establishes the multipath by considering the heterogeneous interface environment.

2. Description of Related Art

In modern society, a variety of multimedia services are provided for use at any time and in any place due to the development of the Internet and mobile communication technology. Particularly, small-size portable devices such as notebook personal computers (PC) and personal digital assistants (PDA) have come into wide use. More particularly, such devices are used for Internet-based data communication via both wired and wireless networks.

One type of wireless network is the ad hoc network. Unlike other types of wireless networks, an ad hoc network does not include a centralized management unit and a fixed control unit, and does not use a conventional communication-based structure. In other types of wireless networks, fixed control units such as routers, hosts, and wireless base stations are utilized for connecting mobile nodes. However, in ad hoc networks, the mobile nodes themselves function as routers. Accordingly, when a predetermined mobile node communicates with a correspondent node, the predetermined mobile node is required to establish an ad hoc communication path via mobile nodes located between the predetermined mobile node and the correspondent node.

A sensor network comprised of a plurality of sensors is included in ad hoc networks. Currently, development of low-priced, low-power consumption, and multifunctional sensor nodes has accelerated due to advances in wireless communication. Accordingly, sensor networks comprised of a number of small-sized sensor nodes may be utilized to perform operations such as sensing, data processing, and communication. Within such sensor networks, however, in order to collect and convey desired information via many sensor nodes, a routing protocol among sensor nodes comprised of only a wireless interface is needed. Also, such sensor networks must deal with phenomena caused by free movement of sensor nodes.

However, according to the conventional art, when establishing a multipath in a heterogeneous interface environment, each sensor node separately processes for each interface. Accordingly, control messages transmitted may unnecessarily increase.

Accordingly, there is a need for a method and apparatus for establishing a multipath which establishes the multipath in consideration of the heterogeneous interface environment.

SUMMARY OF THE INVENTION

Exemplary embodiments of the present invention address at least the above problems and/or disadvantages and provide at least the advantages described below. Accordingly, an aspect of exemplary embodiments of the present invention is to provide a method and apparatus for establishing a multipath in a heterogeneous interface environment which prevent unnecessary control messages from being transmitted to thereby reduce the overhead of control message transmission.

Exemplary embodiments of the present invention also provide a method and apparatus for establishing a multipath in a heterogeneous interface environment which efficiently use a path which is established for each heterogeneous interface to thereby improve data transmission performance.

According to an aspect of exemplary embodiments of the present invention, there is provided a method of establishing a multipath in a heterogeneous interface environment among wireless nodes comprising a source node, a relay node, and a destination node which receives a message from the source node via the relay node. The method includes receiving a route request message by a wireless node; and associating at least two heterogeneous interfaces of the wireless node by using a destination node address in the route request message. According to an aspect of exemplary embodiments of the present invention, associating includes determining whether the destination node address matches with a first address associated with an interface which receives the route request message; determining whether the destination node address exists in an address table stored in the wireless node when the destination node address does not match the first address; transmitting a first route reply message when the destination node address exists in the address table; and establishing a virtual path between the at least two heterogeneous interfaces.

According to another aspect of exemplary embodiments of the present invention, there is provided an apparatus for establishing a multipath in a heterogeneous interface environment. The apparatus includes a transceiving unit for connecting with at least two heterogeneous interfaces and receiving a route request message via an interface of the at least two heterogeneous interfaces; and a control unit for receiving the route request message via the transceiving unit and associating the at least two heterogeneous interfaces by using a destination node address in the route request message.

According to still another aspect of exemplary embodiments of the present invention, there is provided an apparatus for establishing a multipath. The apparatus includes a plurality of heterogeneous network interfaces; a transceiving unit for receiving a route request message via a first network interface of the plurality of heterogeneous network interfaces; and a control unit for comparing a destination node address in the route request message to network addresses associated with the plurality of heterogeneous network interfaces, and for transmitting a route reply message corresponding to the route request message. According to an aspect of exemplary embodiments of the present invention, the control unit transmits the route reply message corresponding to the route request message when the destination node address in the route request message matches with any one of the network addresses associated with the plurality of heterogeneous network interfaces. Also, the control unit forwards the route request message when the destination node address in the route request message does not match any one of the network addresses associated with the plurality of heterogeneous network interfaces.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following detailed description, taken in conjunction with the accompanying drawings in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
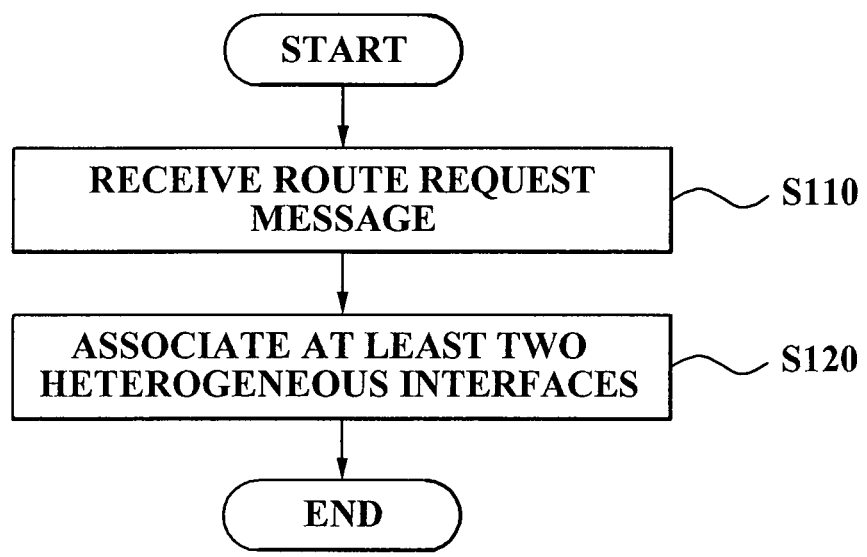
FIG. 1 is a flowchart illustrating a method of establishing a multipath in a heterogeneous interface environment according to an exemplary embodiment of the present invention.

FIG. 1 is a flowchart illustrating a method of establishing a multipath in a heterogeneous interface environment according to an exemplary embodiment of the present invention.

Establishing a routing path between a source node and a destination node is described. Here, although a method of establishing a multipath in a heterogeneous interface environment is described based on an on-demand method which generates the routing path when the source node requests the destination node for establishing the routing path, the present invention is not limited to the described exemplary embodiments.

When a source node of wireless nodes desires to forward predetermined information to a destination node, but may not directly forward the information due to a long distance between the source node and the destination node, the information may be forwarded via other nodes located between the source node and the destination node. Specifically, a routing path via the other nodes located between the source node and the destination node is established, and the information is transmitted via the routing path. The routing path described above is established by exchanging a route request message (RREQ) and a route reply message (RREP). Specifically, when the source node transmits the route request message to a neighbor node, which may be a relay node, the neighbor node stores the source node as an upstream node, and transmits the transmitted route request message to another neighbor node. A network address of the destination node, such as an Internet protocol (IP) address, is stored in the route request message. Accordingly, relay nodes receive a route request packet to confirm whether each of the relay nodes is the destination node. When the relay node is not the destination node, the relay node transmits the route request message to a next hop node. When the relay node is the destination node, the relay node confirms information about the relay node which is stored in the received route request message, selects an optimal path, and transmits a route reply message to the optimal path. For example, the destination node transmits the route reply message via the fewest number of relay nodes towards an upstream router transmitting the route request message. Similarly, when the source node receives the route reply message, a main routing path between the source node and the destination node is established.

In a wireless node in which heterogeneous interfaces are installed, the wireless node receives the route request message in operation S110. In this instance, a network address, e.g., an IP address, is established for each network interface in the wireless node in which heterogeneous interfaces are installed. Hereinafter, 'network interface' is referred to as 'interface'.

In operation S120, the wireless node associates at least two heterogeneous interfaces of the wireless node by using a destination node address in the route request message. Here, the 'associating the at least two heterogeneous interfaces' refers to establishing a relationship among a plurality of heterogeneous interfaces which are different from each other. The 'associating the at least two heterogeneous interfaces' may include comparing the destination node address to a first address associated with an interface which receives the route request message, and establishing a virtual path between the at least two heterogeneous interfaces. Also, the 'associating the at least two heterogeneous interfaces' may include an operation of comparing a destination node address in an intermediate node as well as the destination node to an address associated with a heterogeneous interface of the intermediate node.

Figure 2:
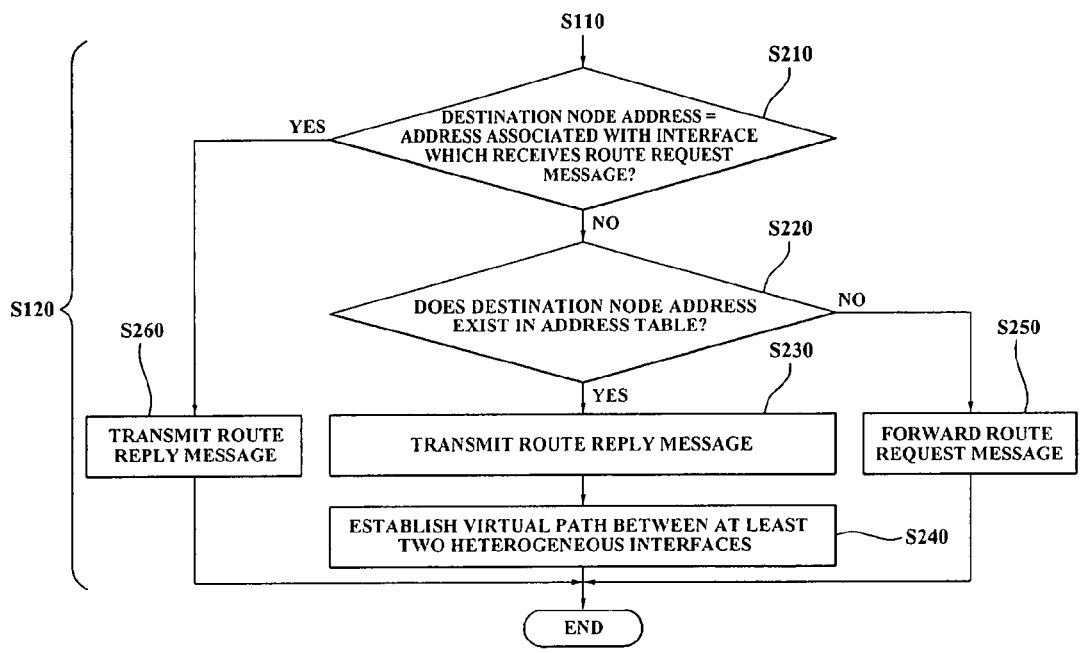
FIG. 2 is a flowchart illustrating an operation of associating at least two heterogeneous interfaces in a method of establishing a multipath in a heterogeneous interface environment according to the method illustrated with respect to FIG. 1.

FIG. 2 is a flowchart illustrating an operation of associating at least two heterogeneous interfaces in a method of establishing a multipath in a heterogeneous interface environment according to the method illustrated with respect to FIG. 1.

In operation S210, a wireless node determines whether a destination node address in a route request message matches with an address associated with an interface which receives the route request message. Each of a plurality of heterogeneous interfaces included in the wireless node is associated with network addresses different from each other. The wireless node determines whether the destination node address in the route request message matches with the address associated with the interface which receives the route request message, among the plurality of heterogeneous interfaces.

In operation S220, when the destination node address in the route request message does not match the address associated with the interface which receives the route request message, the wireless node determines whether the destination node address exists in an address table which is stored in the wireless node. Here, the address table may include 1) network address information associated with the interface which receives the route request message, and 2) network address information associated with at least one interface of remaining interfaces excluding the interface which receives the route request message from all interfaces included in the wireless node. According to another exemplary embodiment of the present invention, the address table of the wireless node includes all network address information associated with all heterogeneous interfaces of the wireless node.

In operation S230, when the destination node address exists in the address table, the wireless node transmits a first route reply message. Here, the first route reply message may be a gratuitous route reply message. For example, the gratuitous route reply message may be used when an intermediate node transmits a route reply message. The first route reply message is preferably forwarded via a unicast method in an opposite direction of a routing path where the route request message is forwarded.

Preferably, the gratuitous route reply message includes address information of the destination node. The address information of the destination node may include a destination field including IP address information, a hop count field, and a lifetime field. The hop count field is set to be '0' when the destination node address is the gratuitous route reply message to thereby indicate an internal processing without externally forwarding. The lifetime field is set to be infinity in order to prevent a routing table from being cancelled, and a routing table list in the lifetime field indicates a valid time.

In operation S240, the wireless node establishes an internal virtual path between the plurality of internal heterogeneous interfaces. In this instance, it is preferable that the wireless node no longer transmits the route request message to a neighbor node.

In operation S250, when the destination node address does not exist in the address table, the wireless node may forward the route request message to a neighbor node. Here, the route request message is preferably forwarded via a broadcast method to the neighbor node.

In operation S260, when the destination node address matches with a network address associated with the interface which receives the route request message, the wireless node may transmit a second route reply message. Here, the second route reply message corresponds to a general route reply message, and is preferably transmitted via unicast in the opposite direction of the routing path where the route request message is forwarded.

Figure 3:
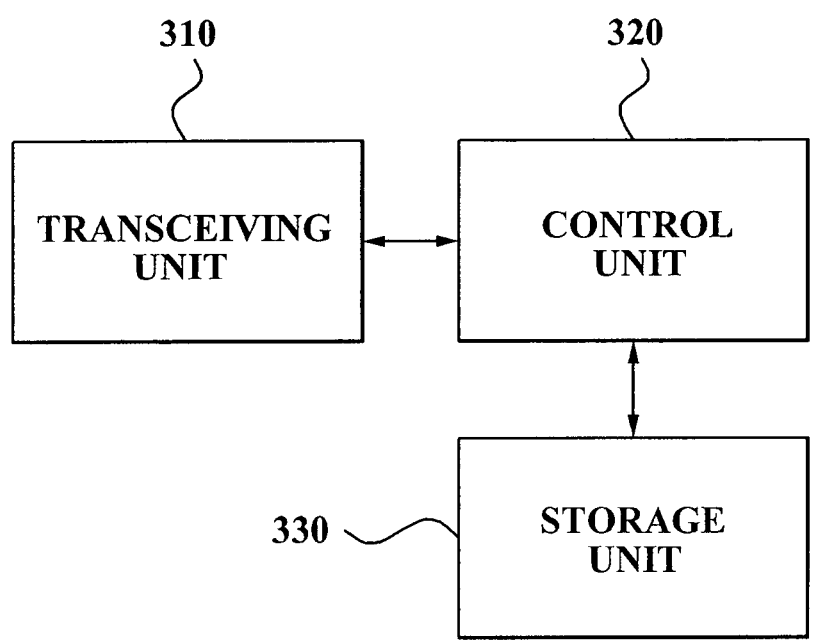
FIG. 3 is a block diagram illustrating an apparatus for establishing a multipath in a heterogeneous interface environment according to an exemplary embodiment of the present invention.

FIG. 3 is a block diagram illustrating an apparatus for establishing a multipath in a heterogeneous interface environment according to an exemplary embodiment of the present invention. The apparatus for establishing a multipath according to an exemplary embodiment of the present invention includes a node having a transceiving unit 310, a control unit 320, a plurality of heterogeneous network interfaces, which are not illustrated, and a storage unit 330. At least one of the plurality of heterogeneous interfaces is connected to an ad hoc network.

The transceiving unit 310 is connected with the plurality of heterogeneous interfaces, receives a route request message via a single interface of the plurality of heterogeneous interfaces, and outputs the received route request message to the control unit 320. Here, the transceiving unit 310 forwards the received route request message to a neighbor node according to a control of the control unit 320. Also, the transceiving unit 310 receives a first route reply message or a second route reply message from the control unit 320, and may transmit the first route reply message or the second route reply message which is received according to the control of the control unit 320. Here, the route request message may be forwarded in a broadcast method. Also, the first route reply message or the second route reply message may be transmitted in a unicast method via a routing path where the route request message is forwarded.

Also, the control unit 320 receives the route request message via the transceiving unit 310, and associates the plurality of heterogeneous interfaces by using a destination node address in the route request message. Here, the control unit 320 determines whether the destination node address matches with an address associated with an interface which receives the route request message. When the destination node address does not match the address associated with the interface which receives the route request message, the control unit 320 determines whether the destination node address exists in an address table which is previously stored in the storage unit 330. When the destination node address exists in the address table, the control unit 320 generates the first route reply message and outputs the generated first route reply message to the transceiving unit 310. The control unit 320 may also establish a virtual path among the plurality of heterogeneous interfaces. Here, the first route reply message may be a gratuitous route reply message.

Also, the control unit 320 generates the second route reply message when the destination node address matches with the address associated with the interface which receives the route request message, and may output the generated second route reply message to the transceiving unit 310. Also, the control unit 320 may control the route request message to be forwarded to a neighbor node via the transceiving unit 310 when the destination node does not exist in the address table.

The storage unit 330 stores the address table including network addresses associated with the plurality of heterogeneous interfaces of the apparatus for establishing a multipath. Here, the address table includes an IP address associated with the interface which receives the route request message. Also, the address table may include address information associated with at least one interface of the other remaining interfaces.

According to an exemplary embodiment of the present invention, the control unit 320 compares the destination node address in the route request message to the network addresses associated with the plurality of heterogeneous network interfaces of the apparatus for establishing a multipath, and transmits a route reply message corresponding to the route request message. For example, when the destination node address in the route request message matches with any one of the network addresses associated with the plurality of heterogeneous network interfaces of the apparatus for establishing a multipath, the control unit 320 transmits the route reply message corresponding to the route request message. Also, when the destination node address in the route request message does not match any one of the network addresses associated with the plurality of heterogeneous network interfaces of the apparatus for establishing a multipath, the control unit 320 forwards the route request message to a neighbor node. In this instance, the control unit 320 forwards the route request message to the neighbor node via a network interface other than a first network interface of the plurality of heterogeneous network interfaces which receives the route request message. Also, when a second network interface associated with a network address matching with the destination node address is different from the first network interface which receives the route request message, the control unit 320 establishes a virtual path between the first network interface and the second network interface.

Figure 4:
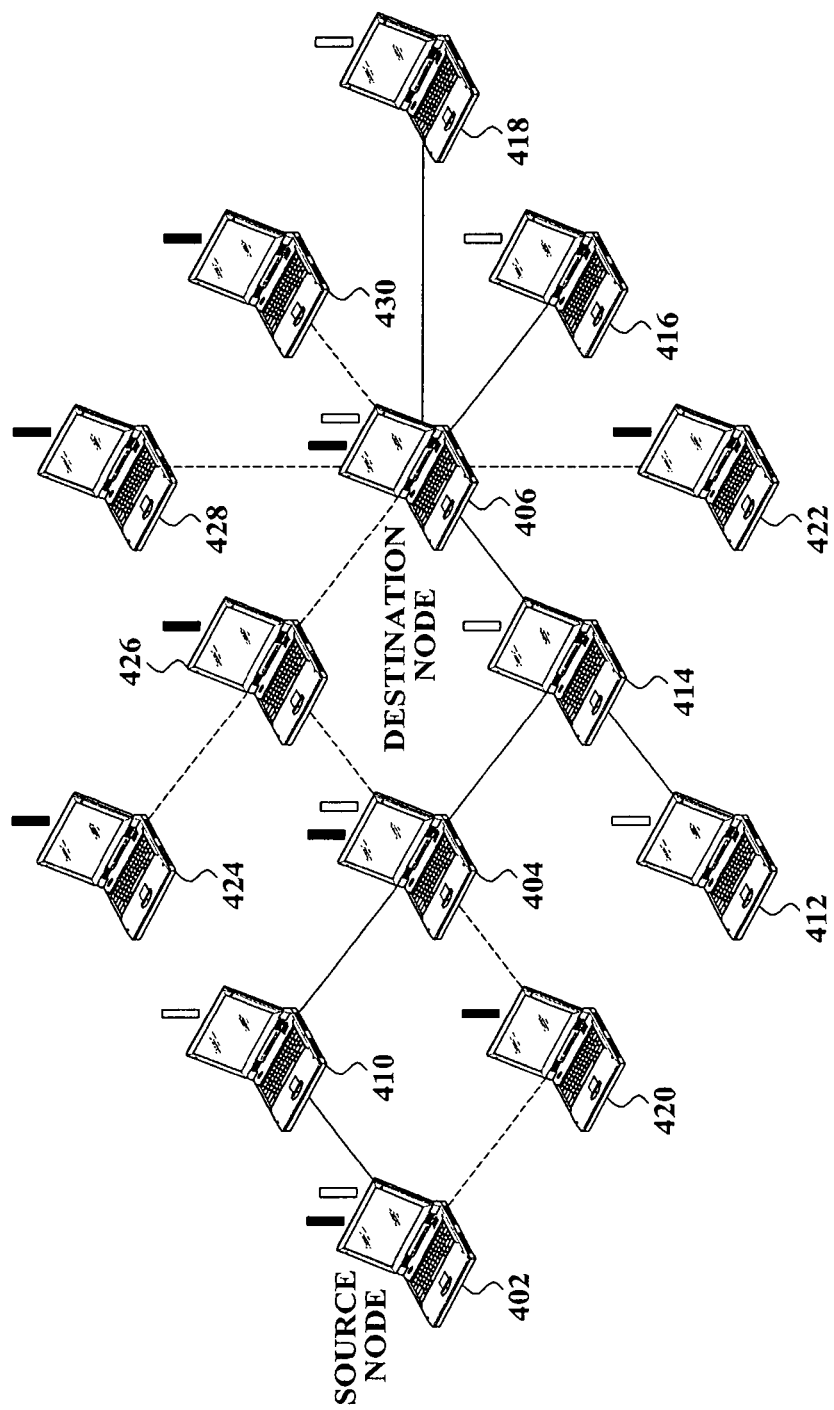
FIG. 4 is a diagram illustrating an example of an operation of an apparatus for establishing a multipath in a heterogeneous interface environment according to an exemplary embodiment of the present invention.

FIG. 4 is a diagram illustrating an example of an operation of an apparatus for establishing a multipath in a heterogeneous interface environment according to an exemplary embodiment of the present invention. An operation of an apparatus for establishing a multipath in a heterogeneous interface environment according to an exemplary embodiment of the present invention is described with reference to FIGS. 3 and 4.

FIG. 4 illustrates a network including wireless nodes where a heterogeneous interface is supported 402, 404, and 406, wireless nodes where a first interface is supported 410, 412, 414, 416, and 418, and wireless nodes where a second interface is supported 420, 422, 424, 426, 428, and 430.

The wireless nodes where the heterogeneous interface is supported 402, 404, and 406 may have a configuration as illustrated in FIG. 3. Also, a routing path by the first interface, which is represented by a solid line, and a routing path by the second interface, which is represented by a dotted line, between a source node 402 and a destination node 406 may be established.

When the source node 402 broadcasts a route request message with respect to the destination node 406 via the first interface and the second interface, the route request message is received in the first interface of the destination node 406 via a first routing path. In this instance, the first routing path is from the source node 402 to the destination node 406 via the relay node 410, the relay node 404, and the relay node 414. Also, the route request message is received in the second interface of the destination node 406 via a second routing path. In this instance, the second routing path is from the source node 402 to the destination node 406 via the relay node 420, the relay node 404, and the relay node 426. The first interface and the second interface correspond to the heterogeneous interface included in the destination node 406.

It is assumed that a network address of a destination, which is used by the source node 402 for establishing a routing path, is a network address associated with the first interface of the destination node 406. Then, the source node 402 transmits the route request message including the network address associated with the first interface of the destination node 406 as a destination address in order to establish the routing path.

A destination node address in the route request message, which is received via the first routing path, is an IP address associated with the first interface of the destination node 406. Accordingly, the destination node 406 transmits a second route reply message via the first interface, and thereby establishes the routing path connecting the source node 402, the relay node 410, the relay node 414, and the destination node 406.

Conversely, the destination node address in the route request message which is received via the second routing path is the network address associated with the first interface of the destination node 406. Accordingly, the destination node address in the route request message does not match an address associated with the interface, i.e., the second interface, of the destination node 406 which receives the route request message. Thus, the destination node 406 determines whether the destination node address exists in an address table stored in the storage unit 330. In this instance, when the destination node address exists in the address table, the control unit 320 of the destination node 406 transmits a first route reply message, which is a gratuitous route reply message, and thereby establishes the routing path by the second interface. The routing path by the second interface connects the source node 402, the relay node 420, the relay node 404, the relay node 426 and the destination node 406. Also, the control unit 320 of the destination node 406 establishes an internal virtual path among internal heterogeneous interfaces. Through this, data which is received via the routing path by the second interface may be processed in the destination node 406.

Also, the destination node 406 no longer transmits the route request message to a neighbor node via the second interface. Accordingly, the overhead of control message transmission is reduced.

When the destination node address in the route request message is the IP address associated with the second interface, a node address of the first interface of the destination node 406 does not match the destination node address in the route request message which is inputted via the routing path by the first interface, connecting the source node 402, the relay node 410, the relay node 404, the relay node 414, and the destination node 406, and via the routing path by the second interface, connecting the source node 402, the relay node 420, the relay node 404, the relay node 426 and the destination node 406. Accordingly, the control unit 320 of the relay node 404 determines whether the destination node address exists in the address table stored in the storage unit 330, and broadcasts the route request message to the neighbor node only when the destination node address does not exist in the address table.

Conversely, when the destination node address in the route request message is the IP address of the second interface, the node address of the second interface of the destination node 406 matches with the destination node address in the route request message which is inputted via the routing path by the second interface, connecting the source node 402, the relay node 420, the relay node 404, the relay node 426, and the destination node 406. Accordingly, the control unit 320 of the destination node 406 transmits a second route reply message, and establishes the routing path by the second interface, connecting the source node 402, the relay node 420, the relay node 404, the relay node 426 and the destination node 406.

Also, the control unit 320 of the destination node 406 determines whether the destination node address exists in the address table stored in the storage unit 330, since the destination node address in the route request message which is inputted via the routing path by the first interface, connecting the source node 402, the relay node 410, the relay node 404, the relay node 414, and the destination node 406 does not match the node address of the first interface of the destination node 406. In this instance, when the destination node address exists in the address table, the control unit 320 of the destination node 406 transmits the first route reply message, which is a gratuitous route reply message, and thereby establishes the routing path by the first interface, connecting the source node 402, the relay node 410, the relay node 404, the relay node 414, and the destination node 406. Also, the control unit 320 of the destination node 406 establishes the internal virtual path among the internal heterogeneous interfaces. Through this, data which is received via the routing path by the first interface may be processed in the destination node 406.

Also, the destination node 406 no longer transmits the route request message to the neighbor node via the first interface. Accordingly, the overhead of control message transmission is reduced.

According to an aspect of exemplary embodiments of the present invention, a method and apparatus for establishing a multipath in a heterogeneous interface environment prevents unnecessary control messages from being transmitted to thereby reduce the overhead of control message transmission. Also, the method and apparatus for establishing a multipath in a heterogeneous interface environment efficiently use a path which is established for each heterogeneous interface to thereby improve data transmission performance.

While the invention has shown and described with reference to certain exemplary embodiments thereof, it will be understood by those skilled in the art that various changes in form and details may be made therein without departing from the spirit and scope of the invention as defined by the appended claims and their equivalents.

What is claimed is:
1. A method of establishing a multipath route in a heterogeneous interface environment among a plurality of wireless nodes comprising a source node, one or more relay nodes, and a destination node comprising a plurality of heterogeneous interfaces, the method comprising:

receiving a route request message comprising a destination node address from the source node via at least one relay node of the one or more relay nodes at the destination node; and establishing a relationship between at least two heterogeneous interfaces of the plurality of heterogeneous interfaces of the destination node in response to determining whether the destination node address exists in an address table of the destination node, wherein the establishing of the relationship between the at least two heterogeneous interfaces comprises:

transmitting a route reply message indicating a routing path from the source node to the destination node via at least one relay node of the one or more relay nodes, determining that the destination node address does not match an address of a first heterogeneous interface of the at least two heterogeneous interfaces in response to the first heterogeneous interface receiving the route request message, determining that the destination node address matches an address of a second heterogeneous interface of the at least two heterogeneous interfaces stored in the address table, and establishing a virtual path in the destination node between the first heterogeneous interface and the second heterogeneous interface, wherein the transmitting of the route reply message comprises transmitting the route reply message in response to the determining that the destination node address matches the address of the second heterogeneous interface, and wherein the destination node is a final node to which data is transmitted from the source node along the routing path indicated by the route reply message.

2. The method of claim 1, wherein the route reply message is a gratuitous route reply message.

3. The method of claim 1, wherein each of the plurality of heterogeneous interfaces has an Internet Protocol (IP) address that is different from an IP address of every other one of the plurality of heterogeneous interfaces.

4. The method of claim 1, wherein the transmitting of the route reply message comprises transmitting the route reply message at the destination node.

5. The method of claim 1, further comprising:

storing the address table in the destination node prior to receiving the RREQ message such that the address table comprises network address information associated with the interface receiving the RREQ, and network address information associated with at least one interface of remaining interfaces from all interfaces included in the destination node.

6. An apparatus for establishing a multipath route in a heterogeneous interface environment, the apparatus comprising:

a transceiver configured to receive a route request message comprising a destination node address from a first heterogeneous interface of a plurality of heterogeneous interfaces; and a controller configured to:

receive the route request message from the transceiver; and establish a relationship between the first heterogeneous interface and at least a second heterogeneous interface of the plurality of heterogeneous interfaces in response to determining whether the destination node address exists in an address table of the destination node;

wherein the apparatus and the plurality of heterogeneous interfaces are included in a node;

the controller is further configured to:

transmit via the transceiver a route reply message indicating that the node is a destination node and indicating a routing path from a source node to the destination node via at least one relay node in establishing the relationship between the first heterogeneous interface and at least the second heterogeneous interface;

determine that the destination node address does not match an address of the first heterogeneous interface in response to the first heterogeneous interface receiving the route request message;

determine that the destination node address matches an address of the second heterogeneous interface stored in the address table;

transmit the route reply message via the transceiver in response to the controller determining that the destination node address matches the address of the second heterogeneous interface; and establish a virtual path in the destination node between the first heterogeneous interface and the second heterogeneous interface; and wherein the destination node is a final node to which data is transmitted from the source node along the routing path indicated by the route reply message.

7. The apparatus of claim 6, further comprising a storage unit configured to store the address table.

8. The apparatus of claim 7, wherein the route reply message is a gratuitous route reply message.

9. The apparatus of claim 6, wherein each of the plurality of heterogeneous interfaces has an Internet Protocol (IP) address that is different from an IP address of every other one of the plurality of heterogeneous interfaces.

10. An apparatus for establishing a multipath route in a heterogeneous interface environment, the apparatus comprising:

a plurality of heterogeneous interfaces;

a transceiver configured to receive a route request message comprising a destination node address from a first heterogeneous interface of the plurality of heterogeneous interfaces; and a controller configured to:

receive the route request message from the transceiver; and establish a relationship between the first heterogeneous interface and a second heterogeneous interface of the plurality of heterogeneous interfaces in response to determining whether the destination node address exists in an address table of the destination node;

wherein the apparatus is included in a node;

the controller is further configured to:

transmit via the transceiver a route reply message indicating that the node is a destination node and indicating a routing path from a source node to the destination node via at least one relay node in establishing the relationship between the first heterogeneous interface and at least the second heterogeneous interface;

determine that the destination node address does not match an address of the first heterogeneous interface;

determine that the destination node address matches an address of the second heterogeneous interface;

transmit the route reply message via the transceiver in response to the controller determining that the destination node address matches the address of the second heterogeneous interface; and establish a virtual path between the first heterogeneous interface and the second heterogeneous interface; and wherein the destination node is a final node to which data is transmitted from the source node along the routing path indicated by the route reply message.

11. The apparatus of claim 10, wherein at least one of the plurality of heterogeneous interfaces is connected to an ad hoc network.

12. The apparatus of claim 10, wherein the route reply message is a gratuitous route reply message.

13. The apparatus of claim 10, wherein each of the plurality of heterogeneous interfaces has an Internet Protocol (IP) address that is different from an IP address of every other one of the plurality of heterogeneous interfaces.

14. A method of establishing a multipath route in a heterogeneous interface environment among a plurality of wireless nodes comprising a source node, one or more relay nodes, and a destination node comprising a plurality of heterogeneous interfaces and an address table, the method comprising:
receiving a route request message comprising a destination node address from the source node via at least one relay node of the one or more relay nodes at the destination node;
determining whether the destination node address matches an address of a first heterogeneous interface of the plurality of heterogeneous interfaces in response to the first heterogeneous interface receiving the route request message;
determining whether the destination node address matches an address of a second heterogeneous interface of the plurality of heterogeneous interfaces stored in the address table in response to the destination node address not matching the address of the first heterogeneous interface; and
transmitting a gratuitous route reply message indicating a routing path from a source node to the destination node via at least one relay node of the one or more relay nodes and establishing a virtual path in the destination wireless node between the first heterogeneous interface and the second heterogeneous interface in response to the destination node address matching the address of the second heterogeneous interface stored in the address table;
wherein the destination node is a final node to which data is transmitted from the source node along the routing path indicated by the route reply message.

15. The method of claim 14, further comprising transmitting a non-gratuitous route reply message indicating a routing path from the source node to the destination node via at least one relay node of the one or more relay nodes in response to the destination node address matching the address of the first heterogeneous interface.

16. The method of claim 14, further comprising forwarding the route request message in response to the destination node address not matching any address stored in the address table.

17. The method of claim 14, wherein each of the plurality of heterogeneous interfaces has an Internet Protocol (IP) address that is different from an IP address of every other one of the plurality of heterogeneous interfaces.

18. The method of claim 14, wherein the transmitting of the route reply message comprises transmitting the route reply message at the destination node.

19. A method of processing a route request (RREQ) message transmitted from a source node via a routing path and received by a first interface of a plurality of heterogeneous interfaces of a destination node, the method comprising:
determining whether a destination node address in the RREQ message matches an address associated with a second interface of the plurality of heterogeneous interfaces of the destination node in response to the destination node address not matching an address associated with the first interface of the destination node upon comparing the destination node address with addresses stored in an address table of the destination node;
establishing a virtual path in the destination node between the first interface and the second interface in response to the destination node address matching the address associated with the second interface;
determining that the destination node address does not match the address associated with the first interface of the plurality of heterogeneous interfaces in response to the first interface receiving the RREQ message;
determining that the destination node address matches the address associated with the second interlace of the plurality of heterogeneous interfaces stored in the address table;
establishing a virtual path in the destination node between the first interface and the second interface; and
transmitting from the destination node a route reply (RREP) message via the first interface to the source node via the routing path in response to the destination node address matching the address associated with the second interface;
wherein the destination node is a final node to which data is transmitted from the source node along the routing path indicated by the route reply message.

20. The method of claim 19, wherein the RREP message is a gratuitous route reply message.

21. The method of claim 19, further comprising forwarding the RREQ message in response to the destination node address not existing in the address table of the destination node, the address table comprising addresses respectively associated with the plurality of heterogeneous interfaces.

22. The method of claim 19, wherein the routing path is a network path in an ad-hoc network.

23. An apparatus comprising a plurality of heterogeneous interfaces and configured to process an RREQ (route request) message transmitted from a source node via a routing path and received by a first interface of the plurality of heterogeneous interfaces, the apparatus comprising:
a controller configured to:
determine whether a destination node address in the RREQ message matches an address associated with a second interface of the plurality of heterogeneous interfaces of the apparatus in response to the destination node address not matching an address associated with the first interface upon comparing the destination node address with addresses stored in an address table of the destination node; and
establish a virtual path in the apparatus between the first interface and the second interface in response to the destination node address matching the address associated with the second interface;
a transceiver configured to transmit an RREP (route reply) message via the first interface to the source node via the routing path in response to the destination node address matching the address associated with the second interface; and
the controller is further configured to:
determine that the destination node address does not match the address associated with the first interface in response to the first interface receiving the route request message;
determine that the destination node address matches the address associated with the second interface stored in the address table;

transmit the RREP message via the transceiver in response to the controller determining that the destination node address matches the address of the second interface; and establish a virtual path in the destination node between the first interface and the second interface;

wherein the destination node is a final node to which data is transmitted from the source node along the routing path indicated by the route reply message.

24. The apparatus of claim 23, wherein the RREP message is a gratuitous route reply message.

25. The apparatus of claim 23, further comprising a storage unit configured to store the address table comprises addresses respectively associated with the plurality of heterogeneous interfaces;

wherein the transceiver is further configured to forward the RREQ message in response to the destination node address not existing in the address table.

26. The apparatus of claim 23, wherein the routing path is a network path in an ad-hoc network.

* * * * *